(12) United States Patent
Goss et al.

(10) Patent No.: US 8,458,417 B2
(45) Date of Patent: Jun. 4, 2013

(54) GARBAGE COLLECTION IN A STORAGE DEVICE

(75) Inventors: Ryan J. Goss, Lakeville, MN (US); Kevin Gomez, Eden Prairie, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 481 days.

(21) Appl. No.: 12/721,466

(22) Filed: Mar. 10, 2010

(65) Prior Publication Data
US 2011/0225346 A1 Sep. 15, 2011

(51) Int. Cl.
*G06F 12/02* (2006.01)
*G06F 12/16* (2006.01)

(52) U.S. Cl.
USPC ..... 711/159; 711/103; 711/170; 711/E12.009

(58) Field of Classification Search
USPC .......... 711/159, 103, 118, E12.001, E12.009, 711/170, 165
See application file for complete search history.

(56) References Cited

U.S. PATENT DOCUMENTS

| | | | | |
|---|---|---|---|---|
| 7,467,278 B2* | 12/2008 | Creamer et al. | ............... | 711/170 |
| 7,849,275 B2* | 12/2010 | Danilak | ............... | 711/154 |
| 7,949,637 B1* | 5/2011 | Burke | ............... | 707/655 |
| 8,339,881 B2* | 12/2012 | Danilak | ............... | 365/201 |
| 2007/0260843 A1* | 11/2007 | Creamer et al. | ............... | 711/170 |
| 2009/0049234 A1 | 2/2009 | Oh et al. | | |
| 2009/0113112 A1 | 4/2009 | Ye et al. | | |
| 2009/0125671 A1 | 5/2009 | Flynn et al. | | |
| 2010/0122019 A1* | 5/2010 | Flynn et al. | ............... | 711/103 |
| 2011/0066808 A1* | 3/2011 | Flynn et al. | ............... | 711/118 |
| 2011/0225346 A1* | 9/2011 | Goss et al. | ............... | 711/103 |
| 2012/0023144 A1* | 1/2012 | Rub | ............... | 711/103 |

OTHER PUBLICATIONS

Hsieh et al., "Efficient Identification of Hot Data for Flash-Memory Storage Systems," Department of Computer Science and Information Engineering, National Taiwan University, Taipai, Taiwan 106, R.O. C, Feb. 2006,19 pp.
Chang et al., "Efficient Management for Large-Scale Flash-Memory Storage Systems with Resource Conservation," Term paper from National Chiao-Tung University, Hsin-Chu, Taiwan, published on May 13, 2009, 37 pp.
Rayankula et al., "A block-clustering based approach to implement wear leveling in SSD," Project Report for University of Minnesota CSci 8980: Advanced Storage Systems, published on May 13, 2009, 22 pp.
Jung et al., "Cache over Solid State Disk through DiskSIM," Term Project Final Report from University of Minnesota CSci 8980: Advanced Storage Systems, published on May 13, 2009, 29 pp.

(Continued)

*Primary Examiner* — Pierre-Michel Bataille
(74) *Attorney, Agent, or Firm* — Hollingsworth Davis, LLC (57) ABSTRACT

In general, this disclosure relates to garbage collection in a storage device. Aspects of this disclosure describe techniques to identify one or more candidate memory storage blocks that should be recycled during garbage collection. The one or more candidate memory storage blocks may be identified based at least on monitored soft metrics of the candidate memory storage blocks. During garbage collection, the identified one or more candidate memory storage blocks may be recycled to free up storage space.

23 Claims, 4 Drawing Sheets

OTHER PUBLICATIONS

Narang et al., "Integrated Caching and Wear Leveling Algorithm," Term paper, Department of Computer Science, University of Minnesota, published on May 13, 2009, 7 pp.

Mohammed et al., "Improving Hot Data Identification for Hybrid SLC/MLC Device," Term paper from University of Minnesota CSCI 8980: Advanced Storage Systems, published on May 13, 2009, 9 pp.

U.S. Appl. No. 12/721,490, entitled "Logical Block Storage in a Storage Device,", filed Mar. 10, 2010.

U.S. Appl. No. 12/765,761, entitled "Data Segregation in a Storage Device,", filed Apr. 22, 2010.

* cited by examiner

GARBAGE COLLECTION IN A STORAGE DEVICE

BACKGROUND

Solid state storage devices include one or more memory storage blocks. Each one of the one or more memory storage blocks includes one or more physical blocks. Each one of the one or more physical blocks stores data. Once data is stored in a physical block, data cannot be written to that physical block until the entire memory storage block that includes that physical block is recycled. Recycling a memory storage block includes copying the valid data within the memory storage block to another memory storage block or a buffer or a memory block and erasing the data within all the physical blocks of the original memory storage block. New data can then be written to the physical blocks of the original memory storage block for storing. In some examples, recycling a memory storage block includes erasing the invalid data within the memory storage block. Garbage collection generally refers to the act of recycling one or more memory storage blocks.

SUMMARY

In one aspect, the disclosure is directed to a method comprising monitoring, by a device, one or more metrics associated with one or more memory storage blocks of the device, wherein the one or more metrics comprise at least one of a number of physical block reads within the one or more memory storage blocks, a frequency of physical block reads within the one or more memory storage blocks, a duration between access to the one or more memory storage blocks, transistor voltages, and data corruption characteristics for one or more physical blocks within the one or more memory storage, identifying, by the device, at least one memory storage block of the one or more memory storage blocks as a candidate memory storage block for garbage collection based at least on the monitoring of the one or more metrics associated with the at least one memory storage block, processing, by the device, a request for the garbage collection of data stored within the device, and in response to the request for the garbage collection, recycling, by the device, the candidate memory storage block during the garbage collection.

In another aspect, the disclosure is directed to a storage device comprising one or more memory blocks, wherein at least one of the one or more memory blocks comprises one or more memory storage blocks, and wherein at least one of the one or more memory storage blocks comprises one or more physical blocks, and a controller configured to monitor one or more metrics associated with the one or more memory storage blocks, wherein the one or more metrics comprise at least one of a number of physical block reads within the one or more memory storage blocks, a frequency of physical block reads within the one or more memory storage blocks, a duration between access to the one or more memory storage blocks, transistor voltages, and data corruption characteristics for one or more physical blocks within the one or more memory storage, identify at least one memory storage block of the one or more memory storage blocks as a candidate memory storage block for garbage collection based at least on the monitoring of the one or more metrics associated with the at least one memory storage block, process a request for the garbage collection of data stored within the one or more memory storage blocks, and in response to the request for the garbage collection, recycle the candidate memory storage block during the garbage collection.

In another aspect, the disclosure is directed to a machine readable storage medium comprising instructions that cause one or more machines to monitor one or more metrics associated with one or more memory storage blocks of a device, wherein the one or more metrics comprise at least one of a number of physical block reads within the one or more memory storage blocks, a frequency of physical block reads within the one or more memory storage blocks, a duration between access to the one or more memory storage blocks, transistor voltages, and data corruption characteristics for one or more physical blocks within the one or more memory storage, identify at least one memory storage block of the one or more memory storage blocks as a candidate memory storage block for garbage collection based at least on the monitoring of the one or more metrics associated with the at least one memory storage block, process a request for the garbage collection of data stored within the device, and in response to the request for the garbage collection, recycle the candidate memory storage block during the garbage collection.

The details of one or more aspects of the disclosure are set forth in the accompanying drawings and the description below. Other features, objects, and advantages of the disclosure will be apparent from the description and drawings, and from the claims.

DETAILED DESCRIPTION

This disclosure is directed to garbage collection within a storage device. In particular, this disclosure describes examples of techniques for identifying one or more memory storage blocks as candidate memory storage blocks for garbage collection. The candidate memory storage blocks may be identified based at least on one or more metrics of the one or more physical blocks within the candidate memory storage blocks. Non-limiting examples of the one or more metrics include at least one of a number of physical block reads within the one or more memory storage blocks, a frequency of physical block reads within the one or more memory storage blocks, a duration between access to the one or more memory storage blocks, transistor voltages, and data corruption characteristics for one or more physical blocks within the one or more memory storage. In response to a request for garbage collection, the candidate memory storage blocks may be recycled.

Figure 1:
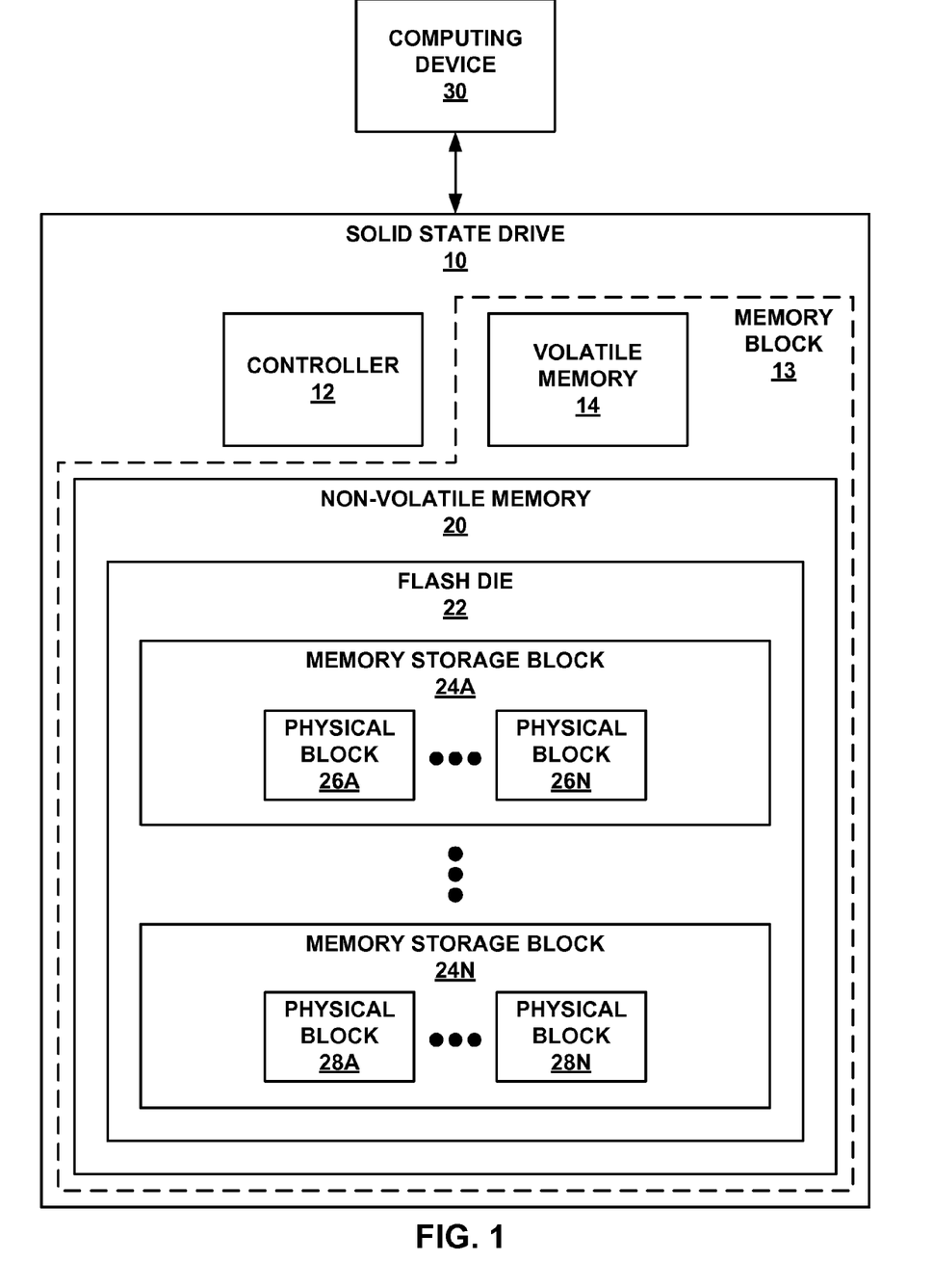
FIG. 1 is a block diagram illustrating an example solid state drive (SSD).

FIG. 1 is a block diagram illustrating an example solid state drive (SSD) 10. SSD 10 may be used as part of an enterprise system. Examples of SSD include, but are not limited to, flash drives, serial advanced technology attachment (SATA) drives, parallel ATA (PATA) drives, serial attached small computer serial interface (SAS) drives, fibre channel storage drives, and the like. In the example of FIG. 1, SSD 10 includes controller 12 and one or more memory blocks such as memory block 13 that includes volatile memory 14 and non-volatile memory 20. Volatile memory 14 may correspond to random access memory (RAM) such as DRAM. Non-volatile memory 20 corresponds to long-term storage of SSD 10. Non-volatile memory 20 may correspond to NAND flash as one non-limiting example. Volatile memory 14 and non-volatile memory 20 may be generally referred to as one or more memory blocks, e.g., memory block 13. In general, SSD 10 includes one or more flash dies, such as flash die 22, each of which include a plurality of memory storage blocks 24A-24N ("memory storage blocks 24"). Examples of memory storage blocks 24 include erasure blocks. Flash die 22 may generally comprise one or more semiconductor chips.

Each of memory storage blocks 24 includes a plurality of physical blocks. In the example of FIG. 1, memory storage block 24A includes physical blocks 26A-26N ("physical blocks 26") and memory storage block 24N includes physical blocks 28A-28N ("physical blocks 28"). It should be understood that the letter N in the reference numerals above is a non-negative integer and that the use of N with respect to different reference numbers should not be understood as implying that the number of items are equal. For example, the number of physical blocks 26 is not necessarily equal to the number of physical blocks 28. Likewise, the number of memory storage blocks 24 is not necessarily equal to the number of memory storage blocks 26 or the number of physical blocks 28.

In the example of FIG. 1, SSD 10 includes controller 12. Controller 12 comprises hardware, such as one or more processors, microprocessors, digital signal processor (DSPs), application specific integrated circuits (ASICs), field programmable gate arrays (FPGAs), or any other equivalent integrated or discrete logic circuitry for performing the functions ascribed to controller 12. In some examples, controller 12 may read instructions from non-volatile memory 20 and/or volatile memory 14 that cause controller 12 to perform the various functions described below. Non-volatile memory 20 and/or volatile memory 14 may be considered as machine readable storage media, processor readable storage mediums, and/or controller readable storage media comprising instructions that cause one or more machines, processors, or controllers to perform various functions. The one or more machines, processors, or controllers may be considered as controller 12. In other examples, computing device 30 coupled to SSD 10 may implement the functionality ascribed to controller 12. For example, an SSD may not include controller 12, and instead a software driver implemented by an operating system of computing device 30 may perform the functions of controller 12. In this manner, a processor or other control unit separate from SSD 10 may control SSD 10.

In general, SSD 10 stores data for a long-term period in a physical block, such as physical block 26A of memory storage block 24A. SSD 10 may store data from computing device 30, and also provide stored data to computing device 30. Non-limiting examples of computing device 30 include a personal computer, a workstation computer, or a mainframe computer.

To write and store data, computing device 30 may create logical blocks of data meant to be stored on one or more physical blocks 26, 28. Computing device 30 may reference each one of the logical blocks of data with an identifier such as a logical block address (LBA). Computing device 30 transmits the logical blocks of data and their corresponding LBAs to controller 12. Controller 12 receives the logical blocks of data and their LBAs and, in some examples, may temporally store the logical blocks data and their LBAs in volatile memory 14. In some examples, controller 12 may repeatedly store logical blocks data and their LBAs in volatile memory 14 until volatile memory 14 becomes full. After the volatile memory 14 is full, controller 12 may retrieve the logical blocks of data and their LBAs stored in volatile memory 14 and write the logical blocks of data to available physical blocks 26, 28 for storage. An available physical block of physical blocks 26, 28 may considered as a physical block that does not currently store data.

To write the logical blocks of data, controller 12 may access physical blocks 26, 28 based on their physical block addresses. In addition, controller 12 may map the LBA of the logical block of data that is written to one or more physical blocks 26, 28 to the physical addresses of the one or more physical blocks 26, 28. For example, computing device 30 may address a logical block of data as LBA1. Controller 12 may store the logical block of data within physical block 26A, assuming physical block 26A is available and the number of bits that can be stored in physical block 26A is greater than or equal to the number of bits of the logical block of data. The physical address for physical block 26A may be addressed as memory storage block 24A, physical block 26A, or in short form, MSB24A PB26A. In this example, controller 12 maps LBA1 to the physical address MSB24A PB26A because that is where the logical block of data is stored. Controller 12 may write additional logical blocks of data in a substantially similar manner.

Controller 12 may store the map of the LBAs and the physical block addresses as metadata. Controller 12 may store the metadata in various storage locations within SSD 10. For example, controller 12 may store the metadata within volatile memory 14, one or more headers of memory storage blocks 24, one or more physical blocks 26, 28, or some other storage block within non-volatile memory 20 (not shown in FIG. 1). As another example, controller 12 may designate one or more memory storage blocks 24 as memory storage blocks for storing the metadata. Moreover, controller 12 may store portions of the metadata throughout different storage locations. For example, some of the metadata may be stored in non-volatile memory 20 and some of the metadata may be stored in the designated memory storage blocks 24. Controller 12 may utilize other techniques to store the metadata, and the examples listed above should not be considered limiting.

After writing logical blocks of data to physical blocks 26, and mapping the LBAs of the logical blocks of data to physical block addresses, controller 12 may erase volatile memory 14. Controller 12 may then receive more logical blocks of data for storage, and write physical blocks 26, 28 and map LBAs to physical block addresses utilizing techniques substantially similar to those described above.

In some examples, rather than temporarily storing the logical blocks of data and their LBAs in volatile memory 14 until volatile memory 14 is full, controller 12 may store logical blocks of data and their LBAs in volatile memory 14 and retrieve the logical blocks of data and the LBAs stored in volatile memory 14 before volatile memory 14 is full. Controller 12 may write the logical blocks of data to available physical blocks 26, 28 and map the LBAs of the logical blocks of data to the physical addresses of physical blocks 26, 28 that store the logical blocks of data. Controller 12 may store the map as metadata.

In some examples, controller 12 may store the logical blocks of data within physical blocks 26, 28 without temporarily storing the logical blocks of data within volatile memory 14. In such examples, controller 12 may identify available physical blocks 26, 28 that can store data. Controller 12 may write the logical blocks of data to the available physical blocks 26, 28 and map the LBAs of the logical blocks of data to the physical addresses of physical blocks 26, 28 that store the logical blocks of data. Again, controller 12 may store the map as metadata.

To read back a logical block of data, computing device 30 may transmit a request for the desired logical block of data to controller 12 based on the LBA of the desired logical block of data. For example, the logical block address for a desired logical block of data may be LBA1. Computing device 30 may transmit a request for logical block of data addressed as LBA1. In response, controller 12 may access the map stored metadata to determine which physical address is mapped to the requested LBA, e.g., which physical address is mapped to LBA1. After identifying which physical address is mapped to LBA1, e.g., MSB24A PB26A, controller 12 may retrieve the logical block of data stored in physical block 26A of memory storage block 24A. Controller 12 may then transmit the retrieved data to computing device 30. In this manner, computing device 30 is capable of retrieving stored data.

When computing device 30 changes, e.g., rewrites, data in a logical block, in some instances, the changed data may not be stored in same physical block where it was stored before. Instead, the rewritten data is stored on one or more different, empty physical blocks 26, 28 and the metadata is updated to indicate that the LBA maps to the address of the physical block where the rewritten data is stored. For example, assume that a logical block with a logical block address of LBA2 is stored within physical block 28A of memory storage block 24N. Accordingly, controller 12 mapped LBA2 to MSB24N PB28A. Computing device 30 may read the data stored in physical block 28A of memory storage block 24N by addressing LBA2. Computing device 30 may then rewrite the logical block that is addressed by LBA2. Next, computing device 30 may store the re-written logical block in SSD 10.

To rewrite the data, computing device 30 may transmit the data, e.g., rewritten logical block, and LBA2 to controller 12. Controller 12 may receive the logical block of data and LBA2, and store the logical block of data in physical bock 26B of memory storage block 24A, assuming physical block 26B is empty. Controller 12 may not be able to store the rewritten logical block of data within physical block 28A of memory storage block 24N. Controller 12 may update the map stored as metadata to indicate that LBA2 maps to MSB24A PB26B.

The original logical block of data, e.g., the logical block of data before it was rewritten, remains in the original physical block, e.g., physical block 28A. However, the data within the original physical block is considered invalid or stale because the LBA no longer maps to the address of original physical block but instead maps to the address of the physical block that stores the rewritten data, e.g., physical block 26B.

In some examples, a physical block in a memory storage block, e.g., physical block 28A of memory storage block 24N, that stores invalid data is not usable until the memory storage block, e.g., memory storage block 24N, is recycled. Recycling one or more of memory storage blocks 24 is referred to as garbage collection. In some examples, during garbage collection, valid data within all physical blocks 26, 28 of memory storage blocks 24 that are being recycled are transferred to different ones of memory storage blocks 24 or a buffer of memory block 13, and the entire memory storage block or blocks is/are erased, e.g., memory storage block 24N. In examples where the valid data is written to the buffer of memory block 13, after recycling, the data may be rewritten into the original memory storage block. In some examples, during data transfer, error correction codes (ECCs) may be employed to correct any errors in the data so that correct data is stored in the different ones of memory storage blocks 24. Also, during data transfer, the map is updated to reflect that the LBAs associated with the valid data are now mapped to physical addresses of the physical blocks of the different ones of memory storage blocks 24. Subsequently, all the physical blocks, e.g., physical blocks 28A-28N, of the just erased memory storage block or blocks, e.g., memory storage block 24N are considered to be empty, and data can be written to the empty physical blocks, e.g., physical blocks 28A-28N. In some examples, during garbage collection, the invalid data is erased without the transfer of valid data from all physical blocks 26, 28 of memory storage blocks 24 that are being recycled to different ones of memory storage blocks 24.

Controller 12 may determine when it is appropriate to perform garbage collection. As described above, after garbage collection, physical blocks that previously stored invalid data are empty and data can be written to those empty physical blocks. Accordingly, garbage collection may be considered as freeing memory space for storage. Controller 12 may determine that garbage collection is needed when more physical blocks 26, 28 are needed than are currently available, e.g., empty.

Over time, as computing device 30 writes data, reads data, and rewrites data, memory storage blocks 24 include physical blocks 26, 28 that store valid or invalid data, or no data, e.g., empty. Again, physical blocks 26, 28 that store invalid data still include data, but that data is not usable because no LBA is mapped to physical blocks 26, 28 that store the invalid data. Computing device 30 may need to write additional data; however, there may not be sufficient physical blocks 26, 28 that are empty to store the additional data. To allow computing device 30 to write and store the data, controller 12 may initiate garbage collection to free up one or more memory storage blocks 24 so that physical blocks 26, 28 are empty and available to store data. Controller 12 may initiate garbage collection, e.g., request garbage collection, based on the number of physical blocks that are available for storing data. For example, controller 12 may monitor the number of empty physical blocks, e.g., monitor the number of physical blocks 26, 28 that are empty. If the number of empty physical blocks is less than a threshold, e.g., less than 10% of the physical blocks are empty, controller 12 may initiate garbage collection to free up physical blocks for storing data. As another example, controller 12 may monitor the number of physical blocks, e.g., monitor the number of physical blocks 26, 28, that store invalid data. If the number of physical blocks that store invalid data that is greater than a threshold, e.g., more than 70% of the physical blocks store invalid data, controller 12 may initiate garbage collection to free up physical blocks for storing data.

The thresholds of 10% and 70% are provided for example purposes only, and should not be considered as limiting. Controller 12 may be programmed with the threshold(s). The threshold(s) may also be variable and set by computing device 30, or some other device. Any technique known in the art to program controller 12 may be utilized to program controller 12 with the threshold(s). Furthermore, the above examples of initiating garbage collection are provided for illustration purposes only. Controller 12 may initiate garbage collection based on other criteria as well. Aspects of this disclosure are not limited to the above examples of initiating garbage collection when the number of empty physical blocks is less than a threshold or when the number of physical blocks that store invalid data is greater than a threshold.

In some examples, controller 12 may not determine when garbage collection is needed. Rather, computing device 30 may determine that garbage collection is needed. For example, computing device 30 may be planning on writing a substantial amount of data. Computing device 30 may request controller 12 to initiate garbage collection to free up memory space. In some examples, the request for garbage collection may be provided by some other device, e.g., another SSD. Also, in some examples, controller 12 may be preprogrammed to periodically perform garbage collection. Accordingly, as used in this disclosure, a request for garbage collection may be generated by computing device 30, controller 12, or some other device. Also, in examples of this disclosure, controller 12 may process the request for garbage collection.

Controller 12 may identify one or more memory storage blocks 24 as candidates for garbage collection. Controller 12 may identify the one or more candidate memory storage blocks prior to a request for garbage collection or in response to a request for garbage collection. Controller 12 may process the request for garbage collection by recycling the identified one or more candidate memory storage blocks of memory storage blocks 24 in response to a request for garbage collection.

Controller 12 may identify the one or more candidate memory storage blocks for garbage collection based at least on one or more metrics of memory storage blocks 24. These one or more metrics may be referred to as soft metrics. Examples of soft metrics include, but are not limited to, a number of times physical blocks 26, 28 have been read, a frequency at which physical blocks 26, 28 have been read, a duration between access to one or more memory storage blocks 24, gate voltages for the transistors within physical blocks 26, 28, and data corruption characteristics of physical blocks 26, 28, e.g., an indication of how much data stored within physical blocks 26, 28 become corrupted, as explained below. In some examples, controller 12 may identify one or more candidate memory storage blocks for garbage collection based on the one or more example metrics described above, as well as, one or more additional example metrics. The one or more additional metrics may be referred to as hard metrics. Examples of hard metrics include a number of physical blocks 26, 28 within memory storage blocks 24 that store data that is invalid, a number of times memory storage blocks 24 have been programmed, and the number of times memory storage blocks 24 have been erased.

In some examples, controller 12 may monitor the soft metrics and the hard metrics. In some examples, controller 12 may only monitor the soft metrics. Controller 12 may store the monitored values in memory 13, e.g., in volatile memory 14 and/or non-volatile memory 20. In some examples, controller 12 may include dedicated memory to store the soft metrics and hard metrics values.

The soft metrics may aid in indicating physical blocks 26, 28 that may experience read disturbs. Read disturb is a phenomenon that may occur when physical blocks 26, 28 are read multiple times. Read disturb may be more prevalent in smaller sized examples of SSD 10. In some examples, when one or more of physical blocks 26, 28 are read multiple times, data within the other physical blocks 26, 28 within the same memory storage blocks 24 may become corrupted, as well as, in some examples, the data within the physical blocks 26, 28 that are read multiple times. The corruption of data in physical blocks 26, 28 caused by the reading of data in the other physical blocks 26, 28 is referred to as read disturb.

In some specific scenarios, read disturb may occur when at least one physical block of physical blocks 26, 28 is read approximately 20,000 to 100,000 times, but the read disturb level may be outside the range as well. For example, if physical block 26A is read approximately 50,000 times, the data with physical block 26A, as well as, the data with physical blocks 26B-26N may become corrupted. Controller 12 may monitor the number of times physical blocks 26, 28 of memory storage blocks 24 are being read by computing device 30 to identify when one or more of memory storage blocks 24 may experience read disturb.

The number of times physical blocks 26, 28 can be read before experiencing or causing a read disturb may be referred to as a read disturb characteristic. The read disturb characteristic may be different for different memory storage blocks 24. For example, the read disturb characteristic for physical blocks 26 may be 70,000 reads, while the read disturb characteristic for physical blocks 28 may be 50,000 reads. Moreover, the read disturb characteristics for different physical blocks 26, 28 within one of memory storage blocks 24 may be different. For example, the read disturb characteristic for physical block 28A may be 90,000 reads and the read disturb characteristic for physical block 28B may be 80,000 reads. The preceding read disturb levels are provided for example purposes only and should not be considered as limiting. The read disturb levels for the different physical blocks 26, 28 may be measured during manufacturing of SSD 10, or may be tested for after manufacturing SSD 10. Controller 12 may be preprogrammed with the read disturb characteristics for each one of physical blocks 26, 28 to identify when one or more of memory storage blocks 24 may experience read disturb.

Furthermore, when one or more of physical blocks 26, 28 are read multiple times, those physical blocks 26, 28 experience wear. When physical blocks 26, 28 experience wear, the voltages on the transistors, e.g., gates of the transistors, within physical blocks 26, 28 may increase above or drop below a threshold voltage level. Controller 12 may measure the voltages on the transistors within physical blocks 26, 28 of memory storage blocks 24 and compare the measured voltages to the threshold. Based on comparison, controller 12 may identify those memory storage blocks 24 as possibly being affected by read disturb, e.g., the measured voltages are greater than or less than the threshold. In some examples, controller 12 may perform self-diagnostic, e.g., test mode, and measure the voltages on the transistors in the test mode.

Moreover, different physical blocks 26, 28 may possess different data corruption characteristics. Data corruption characteristics may relate to the ability of physical blocks 26, 28 to store data without corrupting the data. As described above, when one of physical blocks 26, 28 is read many times, data within other physical blocks 26, 28 within the same memory storage block 24 may become corrupted. However, certain physical blocks 26, 28 may be more susceptible to have their data corrupted compared to others. For example, physical block 26B may be more susceptible to have its data corrupted than physical block 24B. The data corruption characteristics of physical blocks 26, 28 may be measured during manufacturing of SSD 10, or may be tested for after manufacturing SSD 10.

In some aspects, the data corruption characteristics of physical blocks 26, 28 may be measured during the operation of SSD 10. As described above, during data transfer from one physical block to another, error correction codes may be applied to correct corrupt data within the physical block. The application of the error correction codes may correct the corrupt data, as well as, indicate a number of corrupted bits in the data. The number of corrupted bits in the data may indicate the data corruption characteristics of physical blocks 26, 28.

In some examples, controller 12 may also monitor a frequency at which physical blocks 26, 28 are read. For example, controller 12 may monitor that physical block 26A is read at a 100 reads per minute. The frequency at which physical blocks 26, 28 are read may allow controller 12 to predict which ones of physical blocks 26, 28 will be read often in the future. The frequency at which physical blocks 26, 28 are read may indicate the likelihood of physical blocks 26, 28 experiencing read disturb.

Controller 12 may also monitor a duration between access to one or more memory storage blocks 24. The duration may indicate how much time elapsed between when one or more memory storage blocks 24 were accessed, and then subsequently accessed. The duration may indicate the likelihood of the physical blocks within one or more memory storage blocks 24 experiencing a read disturb.

In addition to monitoring the non-limiting examples of soft metrics described above, controller 12 may also monitor the temperature of SSD 10. The temperature of SSD 10 may affect the read disturb characteristics and the data corruption characteristics of physical blocks 26, 28. As described above, physical blocks 26, 28 may experience read disturb after being read 100,000 times, as a non-limiting example. The temperature of SSD 10 may cause physical blocks 26, 28 to experience read disturb after being read less than 100,000 if the temperature of SSD 10 is relatively high. Also, if the temperature of SSD 10 is relatively high, the number of bits that may become corrupt, e.g., the data corruption characteristics, may increase.

As described above, controller 12 may monitor the example soft metrics of physical blocks 26, 28 of memory storage blocks 24. Based on the monitoring, controller 12 may identify candidate memory storage blocks 24 that should be recycled during garbage collection. For example, if one or more physical blocks 26 of memory storage block 24A have been read many times, e.g., close to 100,000 times, controller 12 may identify memory storage block 24A as a candidate memory storage block that should be recycled in response to a request for garbage collection. As another example, if the read disturb characteristic of physical block 28A indicates that physical block 28A experiences read disturb after 50,000 reads, controller 12 may identify memory storage block 24N as a candidate memory storage block that should be recycled during garbage collection when physical block 28A has been read close to 50,000 reads.

Similarly, controller 12 may identify candidate memory storage blocks 24 that should be recycled during garbage collection based on the transistor voltages, the frequency of physical block reads of physical blocks 26, 28, a duration between access to one or more memory storage blocks 24, and/or data corruption characteristics. For example, if the voltages of the transistors within physical block 28A are greater than or less than a threshold, controller 12 may identify memory storage block 24N as a candidate memory storage block that should be recycled during garbage collection. As another example, if the data corruption characteristics of physical block 26A indicate that physical block 26A is more susceptible to read disturb than physical blocks 28, controller 12 may identify memory storage block 24A as a better candidate memory storage block compared to memory storage block 24N that should be recycled during garbage collection. As yet another example, if the frequency of reads for physical block 26A is higher than the frequency of reads for physical block 28A, controller 12 may identify memory storage block 24A as a better candidate memory storage block compared to memory storage block 24N that should be recycled during garbage collection.

In some examples, controller 12 may utilize all of the soft metrics to identify candidate memory storage blocks 24 that should be recycled during garbage collection. Again, non-limiting examples of soft metrics include a number of physical block reads within the one or more memory storage blocks, a frequency of physical block reads within the one or more memory storage blocks, a duration between access to the one or more memory storage blocks, transistor voltages, and data corruption characteristics for one or more physical blocks within the one or more memory storage. However, aspects of this disclosure should not be considered so limited.

In some examples, rather than utilizing all the soft metrics, controller 12 may utilize less than all of the soft metrics to identify candidate memory storage blocks 24 that should be recycled during garbage collection. Furthermore, in addition to utilizing soft metrics, in some examples, controller 12 may utilize hard metrics. For example, controller 12 may monitor the number of physical blocks within memory storage blocks 24 that store invalid data, or may monitor the number of times each one of memory storage blocks 24 has been previously recycled. Based on the hard metrics and soft metrics, controller 12 may identify memory storage blocks that should be recycled during garbage collection.

Controller 12 may, in some instances, weigh the various soft metrics and hard metrics differently. Based on the importance of the various soft metrics and hard metrics, e.g., the weight, controller 12 may identify the candidate memory storage blocks that should be recycled during garbage collection. For example, the number of times physical blocks within memory storage blocks 24 are read may be of more importance than other soft metrics. Therefore, if, for example, the transistor voltages of memory storage block 24A indicate that the transistor voltages are within a suitable range, but physical blocks 26A-26N have been read less times than physical blocks 28A-28N of memory storage block 24N, then memory storage block 24N may be a better candidate memory storage block that should be recycled during garbage collection as compared to memory storage block 24A.

As another example, the number of times physical blocks within memory storage blocks 24 are read may be of more importance than the number of physical blocks 26, 28 that store invalid data. In this example, even though the hard metrics is less important than the soft metrics, if the number of physical blocks 26, 28 that store invalid data is very large compared to number of times physical blocks within memory storage blocks 24 have been read, then it may be possible that memory storage blocks 24 that include physical blocks that store invalid data are recycled before memory storage blocks 24 that have been read many times because the number of physical blocks 26, 28 that store invalid data is very large.

The importance of the soft metrics and hard metrics, e.g., the relative weighting of the soft and hard metrics, may be different for different examples of SSD 10. The importance of the soft and hard metrics may be determined during manufacturing or testing after manufacturing. The importance of the soft and hard metrics may also be based on the type of system that uses SSD 10 for storage. Controller 12 may be preprogrammed with the importance of the soft metrics and hard metrics.

By balancing the importance of the soft and hard metrics, aspects of this disclosure may provide robust techniques to reduce the number of times that memory storage blocks 24 need to be recycled and may also mitigate against read disturbs. By integrating garbage collection with recycling memory storage blocks 24 that may experience read disturb, controller 12 may be able to recycle appropriate memory storage blocks 24 at once, during garbage collection, instead of at two different times. For example, controller 12 may not need to recycle memory storage blocks 24 that experienced read disturbs or may experience read disturbs in the near future, and then recycle other memory storage blocks 24 during garbage collection. Rather, controller 12 may recycle memory storage blocks 24 that may experience read disturbs during the garbage collection. Accordingly, aspects of this disclosure may reduce the number of times memory storage blocks 24 need to be recycled. Also, by monitoring soft metrics to identify candidate memory storage blocks that should be recycled, aspects of this disclosure may mitigate against read disturbs by recycling memory storage blocks 24 before they experience read disturbs.

It should be noted that, in some examples, it may be possible for garbage collection to occur after read disturb has already occurred to one or more memory storage blocks 24. For example, the number of times physical block 26A of memory storage block 24A is read may be greater than 100,000 causing a read disturb in memory storage block 24A, and controller 12 has not yet requested garbage collection. Accordingly, the data within physical block 26A and physical blocks 26B-26N may have become corrupted. However, even though the data may become corrupted, the data may still be retrieved from physical blocks 26 during garbage collection, without the need to recycle the data within memory storage block 24A before garbage collection.

For example, by monitoring the soft metrics, controller 12 may have already identified memory storage block 24A as a candidate memory storage block for garbage collection. When controller 12 receives the request for garbage collection, controller 12 may recycle memory storage block 24A. Controller 12 may retrieve the data in physical blocks 26, perform error correction utilizing error correction codes to recover the possibly corrupted data, and store the data in physical blocks 26 into a different one of memory storage blocks 24, e.g., memory storage block 24B. Accordingly, memory storage block 24A may be recycled during the garbage collection, rather than recycling memory storage block 24A and then performing garbage collection. Also, it may be possible that the read disturb corrupted the data to a point where error correction codes are insufficient to recover the corrupted data. However, even though it may be possible for read disturb to occur, aspects of this disclosure may reduce the chances of read disturbances occurring by monitoring soft metrics and identifying candidate memory storage blocks of memory storage blocks 24 that should be recycled during garbage collection.

Reducing the number of times garbage collection is performed may be advantageous. For example, reducing the number of times garbage collection is performed may reduce write amplification. Write amplification may be considered as the number of times data is written to memory storage blocks 24 during garbage collection. During normal write operations by computing device 30, physical blocks 26, 28 of memory storage blocks 24 are written. However, physical blocks 26, 28 of memory storage blocks 24 may also be written during garbage collection when one or more memory storage blocks 24 are recycled. The more memory storage blocks 24 are written to may mean more wear on memory storage blocks 24. The more wear that memory storage blocks 24 experience may mean a higher likelihood that memory storage blocks 24 may become corrupted and potentially unusable. Accordingly, by reducing the number of times garbage collection is performed, the likelihood that memory storage blocks 24 may become corrupted and unusable may reduce.

Figure 2:
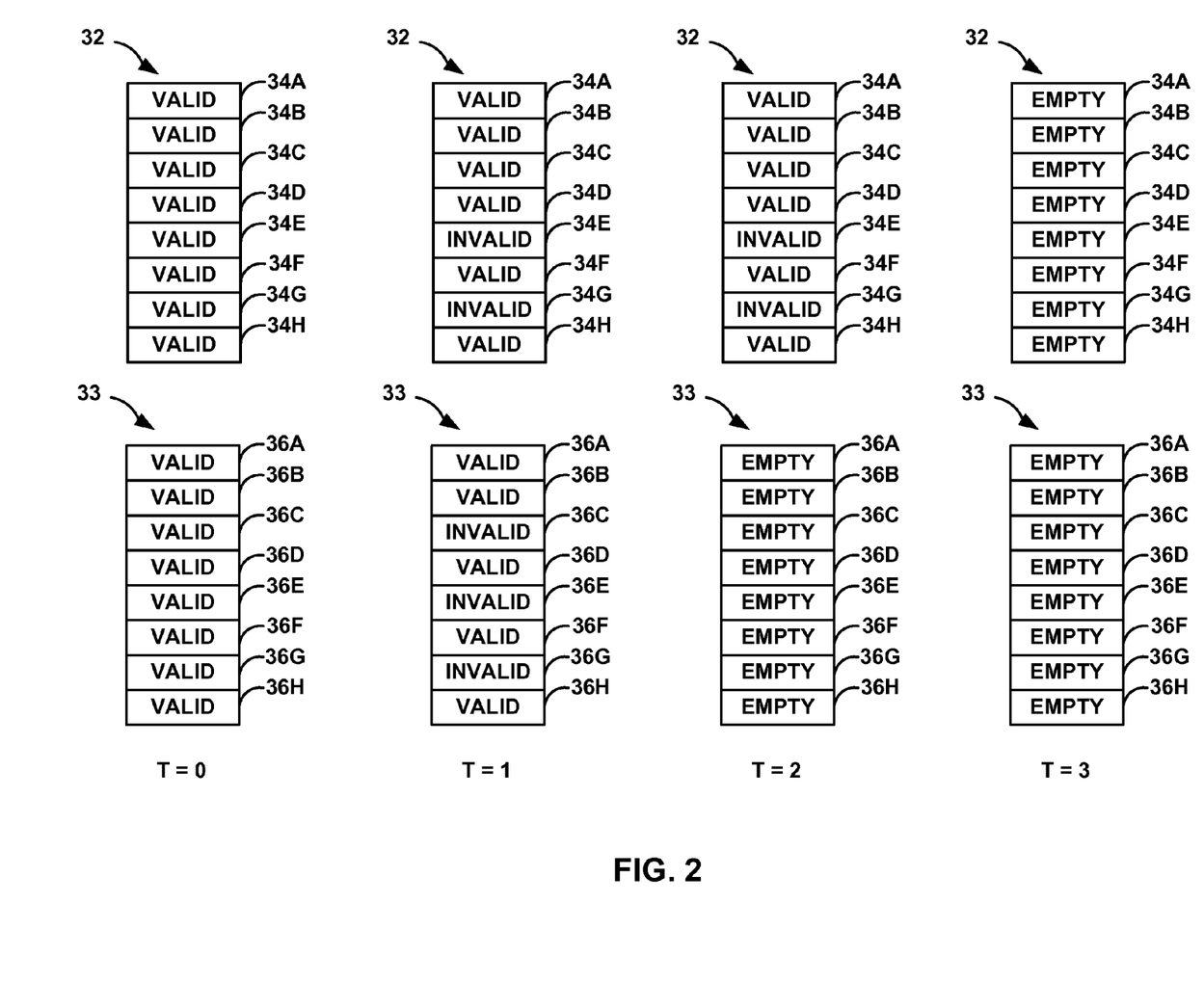
FIGS. 2 and 3 are example illustrations of the recycling operations of the SSD shown in FIG. 1.
Figure 3:
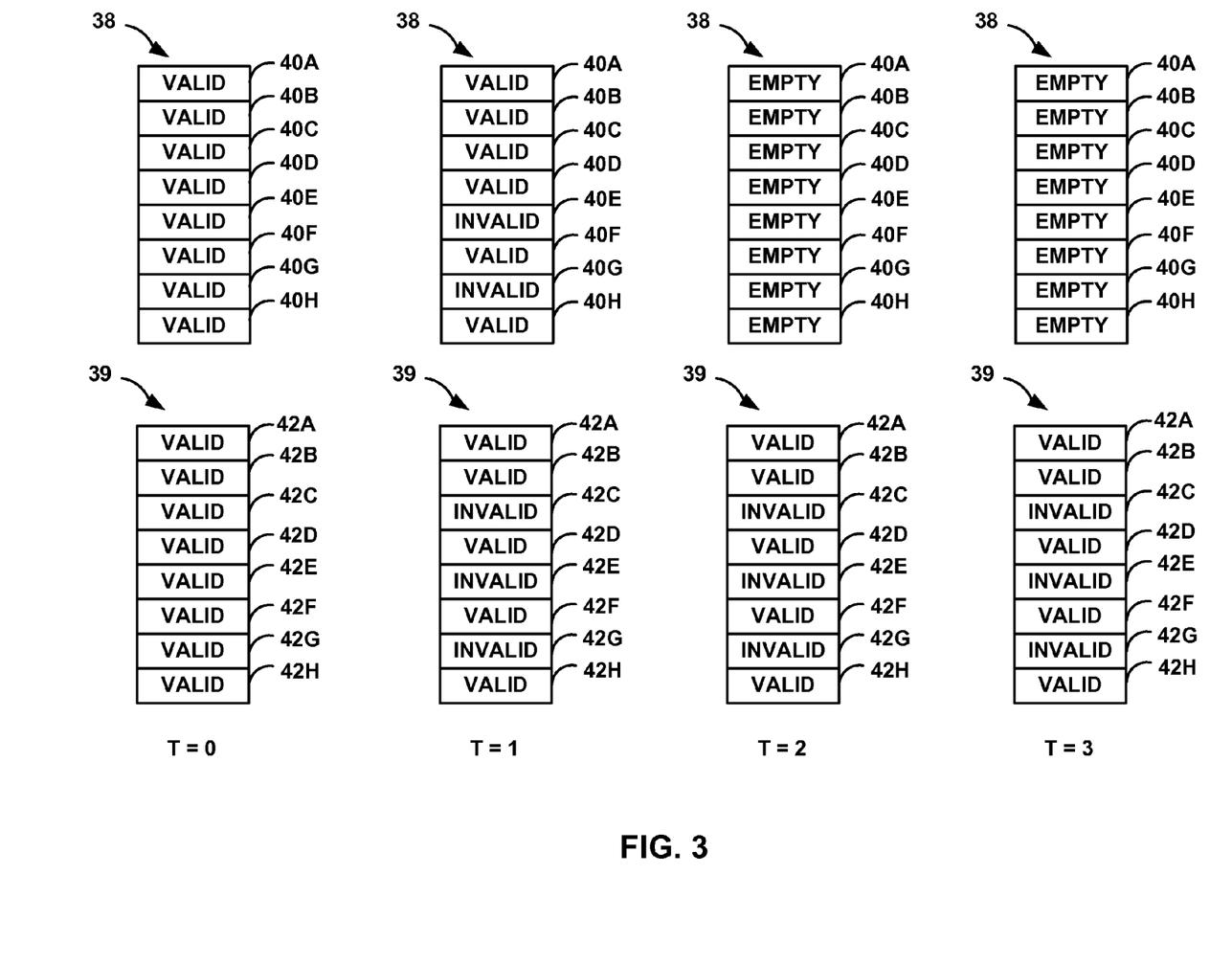

FIGS. 2 and 3 are example illustrations of the operation of SSD 10. FIG. 2 is an example illustration of the operation of SSD 10, in a conventional system, where controller 12 only accounts for hard metrics to identify which memory storage block should be recycled during garbage collection. FIG. 3 is an example illustration of the operation of SSD 10, in accordance with non-limiting aspects of this disclosure, where controller 12 accounts for both hard and soft metrics to identify which memory storage block should be recycled during garbage collection.

FIG. 2 illustrates memory storage block 32 and memory storage block 33 which may be substantially similar to memory storage blocks 24 (FIG. 1). Memory storage block 32 includes physical blocks 34A-34H ("physical blocks 34") which may be substantially similar to physical blocks 26, 28. Memory storage block 33 includes physical blocks 36A-36H ("physical blocks 36") which may be substantially similar to physical blocks 26, 28. At an initial time, e.g., T=0, physical blocks 34 and 36 include valid data. Computing device 30 may then change the data that is initially stored in some of the physical blocks 34 and 36, rendering the data within those physical blocks 34 and 36 invalid. For example, at T=1, the data within physical blocks 34E and 34G and within physical blocks 36C, 36E, and 36G is invalid. Furthermore, in the example of FIG. 2, assume that physical block 34A is read multiple times and memory storage block 32 is approaching read disturb, e.g., physical block 34A is read close to 100,000 times. At a time between T=1 and T=2, controller 12 may determine that garbage collection is needed to free up one memory storage block because only one freed up memory storage block may be needed to store the additional data that is provided by computing device 30 in this example. As described above, in the example of FIG. 2, controller 12 may utilize only hard metrics to determine which memory storage block should be recycled during garbage collection.

Since memory storage block 33 includes more physical blocks with invalid data compared to memory storage block 32, controller 12 may identify memory storage block 33 as the candidate memory storage block for recycling. At T=2, controller 12 may recycle memory storage block 33 so that physical blocks 36 are empty in response to the request for garbage collection. At a time between T=2 and T=3, physical block 34A experiences read disturb because it was read more than 100,000 times. At T=3, to correct the read disturb, controller 12 may recycle memory storage block 32 so that physical blocks 34 are empty.

In the illustrated example operation of FIG. 2, only one memory storage block was needed to be freed up to store the data provided by computing device 30. However, controller 12 needed to recycle memory storage block 33 to free up additional storage space during garbage collection, and then needed to recycle memory storage block 32 to correct the read disturb. Accordingly, controller 12 needed to recycle the data twice and needed to write 11 physical blocks from memory storage blocks 32 into different, additional memory storage blocks, e.g., physical blocks 34A, 34B, 34C, 34D, 34F, 34H, 36A, 36B, 36D, 36F, and 36H.

FIG. 3 illustrates memory storage block 38 and memory storage block 39 which may be substantially similar to memory storage blocks 24 (FIG. 1). Memory storage block 38 includes physical blocks 40A-40H ("physical blocks 40") which may be substantially similar to physical blocks 26, 28. Memory storage block 39 includes physical blocks 42A-42H ("physical blocks 42") which may be substantially similar to physical blocks 26, 28. Similar to FIG. 2, at an initial time, e.g., T=0, physical blocks 40 and 42 include valid data. Computing device 30 may then change the data that is initially stored in some of the physical blocks 40 and 42 rendering the data within those physical blocks 40 and 42 invalid. For example, similar to FIG. 2, at T=1, the data within physical blocks 40E and 40G and within physical blocks 42C, 42E, and 42G is invalid. Furthermore, similar to FIG. 2, in the example of FIG. 3, assume that physical block 40A is read multiple times and memory storage block 38 is approaching read disturb, e.g., physical block 40A is read close to 100,000 times. At a time between T=1 and T=2, controller 12 may determine that garbage collection is needed to free up one memory storage block because only one freed up memory storage block may be needed to store the additional data that is provided by computing device 30, in this example. As described above, in the example of FIG. 3, controller 12 may utilize soft metrics, as well as, hard metrics, in accordance with non-limiting aspects of this disclosure, to determine which memory storage block should be recycled during garbage collection.

In accordance with aspects of this disclosure, as one non-limiting example, even though memory storage block 39 includes more physical blocks with invalid data compared to memory storage block 38, controller 12 may identify memory storage block 38 as the candidate memory storage block for recycling. Controller 12 may identify memory storage block 38 as the candidate memory storage block for recycling, in this example, because memory storage block 38 is approaching a read disturb, e.g., physical block 40A is about to be read more than 100,000 times. At T=2, controller 12 may recycle memory storage block 38 so that physical blocks 40 are empty in response to the request for garbage collection. At T=3, memory storage blocks 38, 39 may be in the same state as they were at T=2.

In the illustrated example operation of FIG. 3, read disturb is mitigated because memory storage block 38 was recycled before read disturb could occur. Moreover, only memory storage block 38 was recycled during garbage collection instead of recycling both memory storage blocks 32, 33 as described above with reference to FIG. 2. Accordingly, controller 12 needed to write 6 physical blocks from memory storage block 38, e.g., physical blocks 40A, 40B, 40C, 40D, 40F, and 40H, into a different, additional memory storage block instead of writing 11 physical blocks as described above with respect to FIG. 2.

Figure 4:
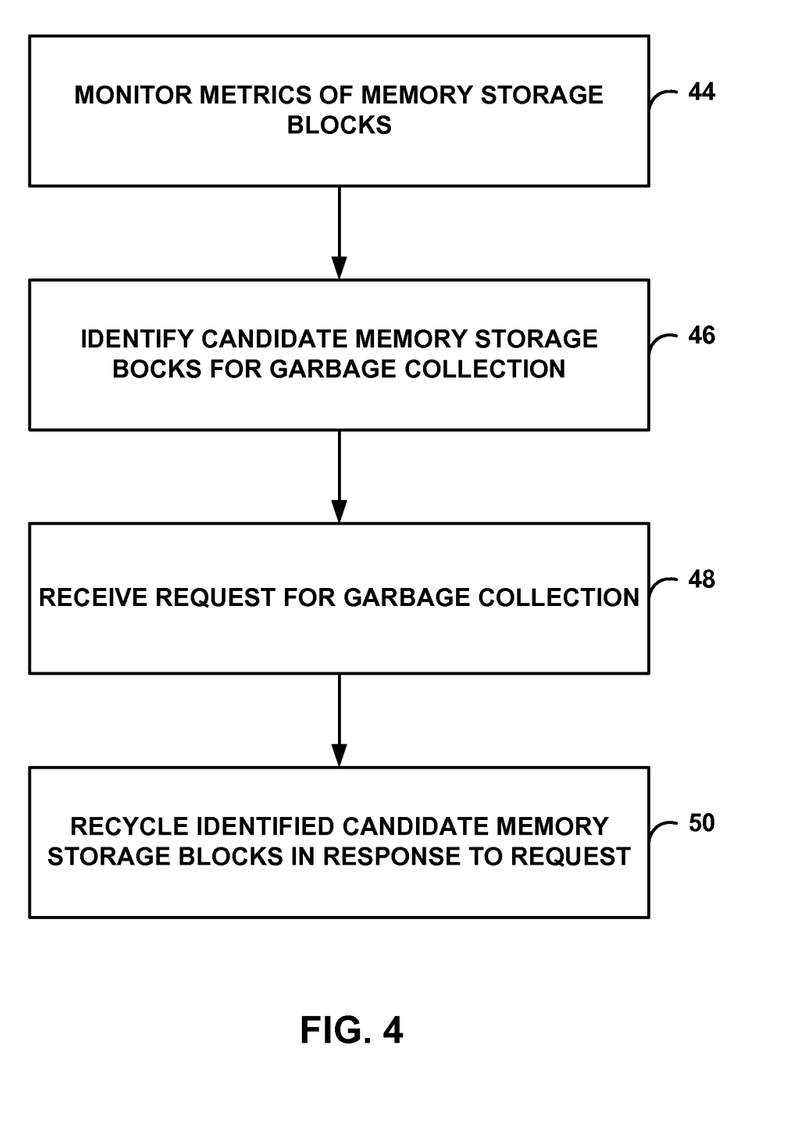
FIG. 4 is a flowchart illustrating an example operation of the SSD shown in FIG. 1.

FIG. 4 is a flowchart illustrating an example operation of SSD 10. For purposes of illustration only and for clarity, reference is made to components of FIG. 1. However, the acts described in the flowchart may be performed by other devices as well. Controller 12 may monitor the metrics of memory storage blocks 24 (44). For example, controller 12 may monitor one or more soft metrics of memory storage blocks 24 such as, but not limited to, the number of times physical blocks 26, 28 have been read, a frequency at which physical blocks 26, 28 have been read, a duration between access to one or more memory storage blocks 24, gate voltages for the transistors within physical blocks 26, 28, and data corruption characteristics of physical blocks 26, 28. In some examples, controller 12 may also monitor the hard metrics of memory storage blocks 24. For example, controller 12 may monitor the number of physical blocks 26, 28 that are currently storing invalid data. As another example, controller 12 may monitor the number of times memory storage blocks 24 have been erased. As yet another example, controller 12 may monitor the number of times memory storage blocks 24 have been programmed.

Based on the metrics, e.g., soft metrics, and in some examples, soft and hard metrics, controller 12 may identify one or more candidate memory storage blocks of memory storage blocks 24 that should be recycled during garbage collection (46). For example, controller 12 may identify a candidate memory storage block based on the number of times physical blocks within that memory storage block have been read. As another example, controller 12 may identify a candidate memory storage block based on the data corruption characteristics of the physical blocks within that memory storage block. In some examples, controller 12 may identify a candidate memory storage block that should be recycled during garbage collection based on all soft metrics. In some examples, controller 12 may identify a candidate memory storage block that should be recycled during garbage collection based on one or more of the soft metrics. Furthermore, in some examples, in addition to identifying candidate memory storage blocks based on soft metrics, controller 12 may also utilize hard metrics to identify candidate memory storage blocks that should be recycled during garbage collection. Controller 12 may assign different weights, e.g., importance, to the various soft metrics and hard metrics. The assignment may be made based on the characteristics of SSD 10 or the system that utilizes SSD 10 as some examples. Based on the importance of the various soft metrics and hard metrics, controller 12 may identify one or more memory storage blocks 24 as candidate memory storage blocks that should be recycled during garbage collection.

Controller 12 may process a request for garbage collection (48). In some examples, the request for garbage collection may be generated internally by controller 12. Controller 12 may determine that there are insufficient number of physical blocks 26, 28 that can store data that will be provided by computing device 10. In response to the determination, controller 12 may request garbage collection. In some examples, controller 12 may periodically request garbage collection. In some other examples, the request for garbage collection may be generated by some other device, e.g., computing device 30 or another storage device.

It should be noted that though the flowchart of FIG. 4 shows that controller 12 may identify one or more candidate memory storage blocks that should be recycled during garbage collection before receiving the request for garbage collection, aspects of this disclosure should not be considered so limiting. In some examples, controller 12 may identify candidate memory storage blocks in response to the request for garbage collection. In other words, controller 12 may receive a request for garbage collection, and in response may identify one or more candidate memory storage blocks that should be recycled.

Controller 12, in response to the request for garbage collection, may recycle the identified one or more candidate memory storage blocks (50). To recycle the one or more candidate memory storage blocks, controller 12 may copy valid data within the physical blocks of the candidate memory storage blocks into different one or more memory storage blocks 24. Controller 12 may also update the map to indicate that the LBAs are now mapped to the addresses of the physical blocks of the different one or more memory storage blocks. Controller 12 may then erase the one or more candidate memory storage blocks. The candidate memory storage blocks may then be available to store data from computing device 30.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable, machine readable, or processor readable data storage medium comprising instructions that, when executed, cause a processor or controller to perform one or more of the methods described above.

The code or instructions may be software and/or firmware executed by processing circuitry including one or more controllers, one or more processors, such as one or more DSPs, general purpose microprocessors, ASICs, FPGAs, ASSPs, or other equivalent integrated or discrete logic circuitry. Accordingly, the term "controller" or "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A storage device comprising:
one or more memory storage blocks comprising non-volatile solid state memory; and
a controller configured to:
monitor one or more metrics associated with reading the one or more memory storage blocks, wherein the one or more metrics are indicative of read disturb in the one or more memory storage blocks;
identify at least one memory storage block of the one or more memory storage blocks as a candidate memory storage block for garbage collection based at least on the monitoring of the one or more metrics associated with the at least one memory storage block and in response to the one or more metrics indicating that the candidate memory storage block is more susceptible to read disturb than other memory storage blocks of the device;
process a request for the garbage collection of data stored within the one or more memory storage blocks; and
in response to the request for the garbage collection, erase the candidate memory storage block during the garbage collection.

2. The storage device of claim 1, wherein the controller is configured to identify, in response to the request for the garbage collection, at least one memory storage block of the one or more memory blocks as the candidate memory storage block.

3. The storage device of claim 1, wherein the one or more memory storage blocks comprise one or more erasure blocks.

4. The storage device of claim 1, wherein the controller is further configured to:
monitor one or more additional metrics associated with program and erase of the one or more memory storage blocks; and
identify at least one memory storage block of the one or more memory storage blocks as a candidate memory storage block for the garbage collection based on both the monitoring of the one or more metrics associated with the at least one memory storage block and the monitoring of the one or more additional metrics associated with the at least one memory storage block.

5. The storage device of claim 4, wherein the one or more additional metrics comprise at least one of a number of invalid physical blocks contained within the one or more memory storage blocks, a number of times physical blocks contained within the one or more memory storage blocks is programmed, and a number of times physical blocks contained with the one or more memory storage blocks is erased.

6. The storage device of claim 1, wherein the controller is further configured to:
monitor a temperature of the storage device; and
identify at least one memory storage block as the candidate memory storage block for garbage collection based at least on the monitoring of the one or more metrics associated with the at least one memory storage block and the temperature of the device.

7. The storage device of claim 1, wherein the controller is configured to:
copy valid data within one or more physical blocks of the candidate memory block into one or more physical blocks of another one of the one or more memory storage blocks or buffer of a memory block; and
erase the data within the one or more physical blocks of the candidate memory storage block to recycle the candidate memory storage block during the garbage collection.

8. The storage device of claim 1, wherein the controller is configured to erase invalid data within the one or more physical blocks of the candidate memory storage block to recycle the candidate memory storage block during the garbage collection.

9. The storage device of claim 1, wherein a first memory block of the one or more memory blocks comprises non-volatile memory and a second memory block of the one or more memory blocks comprises volatile memory.

10. The storage device of claim 1, wherein the one or more metrics comprise at least one of:
a number of physical block reads within the one or more memory storage blocks;
a frequency of physical block reads within the one or more memory storage blocks;
a duration between access to the one or more memory storage blocks;
transistor voltages; and
data corruption characteristics for one or more physical blocks within the one or more memory storage.

11. A method comprising:
monitoring, by a device, one or more metrics associated with reading one or more non-volatile solid state memory storage blocks of the device, wherein the one or more metrics are indicative of read disturb in the one or more memory storage blocks;
identifying, by the device, at least one memory storage block of the one or more memory storage blocks as a candidate memory storage block for garbage collection in response to the monitoring of the one or more metrics associated with the at least one memory storage block and in response to the one or more metrics indicating that the candidate memory storage block is more susceptible to read disturb than other memory storage blocks of the device;
processing, by the device, a request for the garbage collection of data stored within the device; and
in response to the request for the garbage collection, erasing, by the device, the candidate memory storage block during the garbage collection.

12. The method of claim 11, wherein identifying at least one memory storage block of the one or more memory storage blocks as a candidate memory storage block comprises identifying, in response to the request for the garbage collection, at least one memory storage block of the one or more memory blocks as the candidate memory storage block.

13. The method of claim 11, wherein the one or more memory storage blocks comprise one or more erasure blocks.

14. The method of claim 11, further comprising:
monitoring one or more additional metrics associated with program and erase of the one or more memory storage blocks,
wherein identifying at least one memory storage block of the one or more memory storage blocks as a candidate memory storage block for garbage collection comprises identifying at least one memory storage block of the one or more memory storage blocks as a candidate for the garbage collection based on both the monitoring of the one or more metrics associated with the at least one memory storage block and the monitoring of the one or more additional metrics associated with the at least one memory block.

15. The method of claim 14, wherein the one or more additional metrics comprise at least one of a number of invalid physical blocks contained within the one or more memory storage blocks, a number of times physical blocks contained within the one or more memory storage blocks is programmed, and a number of times physical blocks contained with the one or more memory storage blocks is erased.

16. The method of claim 11, further comprising:
monitoring a temperature of the device,
wherein identifying at least one memory storage block comprises identifying the at least one memory storage block as the candidate memory storage block for garbage collection based at least on the monitoring of the one or more metrics associated with the at least one memory storage block and the temperature of the device.

17. The method of claim 11, wherein erasing the candidate memory storage block during the garbage collection comprises:
copying valid data within one or more physical blocks of the candidate memory block into one or more physical blocks of another one of the one or more memory storage blocks of a buffer of a memory block; and
erasing the data within the one or more physical blocks of the candidate memory storage block.

18. The method of claim 11, wherein erasing the candidate memory storage block during the garbage collection comprises erasing invalid data within the one or more physical blocks of the candidate memory storage block.

19. The method of claim 11, wherein the one or more metrics comprise at least one of:
a number of physical block reads within the one or more memory storage blocks;
a frequency of physical block reads within the one or more memory storage blocks;
a duration between access to the one or more memory storage blocks;
transistor voltages; and
data corruption characteristics for one or more physical blocks within the one or more memory storage.

20. A machine readable storage medium comprising instructions that cause one or more machines to:
monitor one or more metrics associated with one or more non-volatile solid state memory storage blocks of a device, wherein the one or more metrics are indicative of read disturb in the one or more memory storage blocks;
identify at least one memory storage block of the one or more memory storage blocks as a candidate memory storage block for garbage collection based at least on the monitoring of the one or more metrics associated with the at least one memory storage block and in response to the one or more metrics indicating that the candidate memory storage block is more susceptible to read disturb than other memory storage blocks of the device;
process a request for the garbage collection of data stored within the device; and
in response to the request for the garbage collection, erase the candidate memory storage block during the garbage collection.

21. The machine readable storage medium of claim 20, further comprising instructions that cause the one or more machines to:
monitor one or more additional metrics associated with the one or more memory storage blocks,
wherein the instructions to identify at least one memory storage block comprise instructions to identify at least one memory storage block of the one or more memory storage blocks as a candidate for the garbage collection based on both the monitoring of the one or more metrics associated with the at least one memory storage block and the monitoring of the one or more additional metrics associated with the at least one memory block, wherein the one or more additional metrics comprise at least one of a number of invalid physical blocks contained within the one or more memory storage blocks, a number of times physical blocks contained within the one or more memory storage blocks is programmed, and a number of times physical blocks contained with the one or more memory storage blocks is erased.

22. The machine readable storage medium of claim 20, further comprising instructions to:
monitor a temperature of the device,
wherein the instructions to identify at least one memory storage block comprise instructions to identify the at least one memory storage block as the candidate memory storage block for garbage collection based at least on the monitoring of the one or more metrics associated with the at least one memory storage block and the temperature of the device.

23. The machine readable storage medium of claim 20, wherein the instructions to erase the candidate memory storage block during the garbage collection comprise instructions to:
copy valid data within one or more physical blocks of the candidate memory block into one or more physical blocks of another one of the one or more memory storage blocks or a buffer of a memory block; and
erase the data within the one or more physical blocks of the candidate memory storage block.

* * * * *